Patented Sept. 18, 1934

1,974,227

UNITED STATES PATENT OFFICE 1,974,227

ARTIFICIAL LUMBER

George Witty, Long Island City, N. Y., assignor of one-half to Otto J. Kalt, New York, N. Y.

No Drawing. Application September 28, 1933, Serial No. 691,419

1 Claim. (Cl. 106—29)

This invention relates to a composition of matter suitable for use as artificial lumber and has for its object to provide a composition of this character which will be comparatively inexpensive to manufacture and more efficient in use than those heretofore proposed.

Owing to the growing scarcity of lumber, it has become highly desirable to provide some substitute therefor which may be cheaply and readily manufactured, preferably from waste products, and which may be utilized for substantially all purposes to which lumber is used.

Throughout the United States an unlimited amount of sawdust and wood shaving is now going to waste, which I have found may be combined with certain other materials to produce an excellent artificial lumber.

The composition is made up of the following ingredients, in approximately the following proportions: 30 parts of magnesium oxide heavy, are mixed with 20 parts of calcined bauxite. Should a particular color be desired in the final product, a powdered mineral pigment may be added to produce the desired shade. To this mixture there is next added 50 parts of sawdust and 10 parts of beach sand and the whole thoroughly mixed. The mixture is then intimately moistened with a solution made of equal parts of magnesium chloride and calcium magnesium chloride of from 25 to 40° Bé., and sufficient water is added to produce a pasty mass.

This mass may be worked into almost any desired form, dependent upon the final use to which the product is to be put. For instance if it is to be employed as a wall board, panels or flooring, it may be readily formed into blocks, sheets or slabs, of suitable dimensions. When so formed, pressure should be applied to compact the mass. The amount of pressure depends upon the final product and the density sought.

The slabs or blocks after being thoroughly compressed, are removed from the molds and transferred into a steam chamber and dried at a temperature of 100° to 200° F., whereupon they will be ready for use, and may be nailed, sawed or cut, and sand papered substantially the same as ordinary lumber. They will have a comparatively smooth finish, due to the bauxite which acts as a filler for the interstices of the sawdust or other base material, and the whole will be firmly bound together by the binding magnesium oxide. The magnesium chloride and calcium magnesium chloride which has been thoroughly incorporated in the mass, renders the final product, hard, water and fire-proof.

In order to facilitate the setting or hardening of the slabs or blocks, they may, if desired be dipped after forming, into a solution made of equal parts of magnesium silicofluoride and potassium sulfate.

Having thus described my invention it is obvious that immaterial modifications may be made in the same without departing from the spirit of the invention, hence, I do not wish to be understood as limiting myself to the exact steps or proportions above set forth.

What I claim as new and desire to secure by Letters Patent is:

An artificial lumber consisting essentially of 30 parts of magnesium oxide, 20 parts of calcined bauxite, 50 parts of sawdust, 10 parts of beach sand, sufficient magnesium chloride and calcium magnesium chloride to intimately moisten the same, sufficient magnesium silicofluoride and potassium sulfate to saturate the mass when first formed; and the whole pressed into shape substantially as described.

GEORGE WITTY.